Jan. 6, 1959 G. A. JEFFREYS 2,867,521
SIMULTANEOUS AEROBIC AND ANAEROBIC COMPOSTING PROCESS
Filed March 3, 1955 3 Sheets-Sheet 1

INVENTOR
George A. Jeffreys
BY
Mason, Fenwick & Lawrence
ATTORNEYS

United States Patent Office 2,867,521
Patented Jan. 6, 1959

2,867,521

SIMULTANEOUS AEROBIC AND ANAEROBIC COMPOSTING PROCESS

George A. Jeffreys, Salem, Va.

Application March 3, 1955, Serial No. 491,980

20 Claims. (Cl. 71—8)

This invention relates to a new and improved process for producing humus from industrial and other wastes.

There are vast quantities of organic waste materials produced annually such as coffee grounds, bagasse, rice hulls, peanut hulls, sawdust, garbage, sewage sludge and the like, that pose difficult disposal problems and that are generally burned or disposed of in over-burdened sewage disposal systems. Such materials, however, can serve as important raw materials for the production of humus which is of enormous value for enriching and replenishing the soil in our agricultural economy.

Various processes have been devised for composting organic wastes but, for the most part, these methods are slow, cumbersome, inefficient, labor-consuming and expensive. All require a long period of time ranging from several weeks to months for effective decomposition of the raw wastes.

The object of this invention is to provide a process for rapidly and thoroughly composting waste organic materials into high grade humus.

Another object is to provide a composting process which is highly efficient and economical and which can be conducted continuously in relatively simple equipment with minimum labor and supervision.

Another object is to provide a composting process which can be completed in a matter of days.

Other objects and advantages will become obvious from the following detailed description.

Broadly speaking, my composting process involves subjecting the raw wastes to at least three and generally four stages of microorganismal activity. Where the waste possesses a substantial content of cellulose and lignin, it is first subjected predominantly to fungal mold action. It then goes through a period of predominant decomposition by bacteria in the mesophilic range, namely bacteria which thrive at temperatures below about 45 to 50° C., followed by a period of maximum activity by bacteria in the thermophilic range, namely bacteria for which temperatures of above about 45 to 50° C. are optimum. The final stage is one in which actinomycetes play the most active role and the thoroughly composted, stabilized material is dried and ready for use. Where cellulosic and lignin content is low as in some garbage wastes or sewage sludge, the initial fungal stage may be omitted so that the activity of mesophilic bacteria predominates in the first stage. There is no clear-cut line of demarcation between the various phases with regard to microorganismal activity and, in fact, there is considerable overlapping. For example, there is a considerable amount of mesophilic bacterial activity during the fungal mold stage. Definition of the successive phases is in terms of the predominant type of microorganismal action.

The raw waste material, if not already so, is desirably ground, shredded or pulverized into a relatively fine state of comminution. Substantially any type of organic waste can be employed in the process as, for example, peanut hulls, rice hulls, coffee grounds, bagasse, garbage, sewage sludge and the like.

If the waste contains substantial amounts of cellulose and lignin components, it is first subjected to the action of molds such as Penicillium, Aspergillus, Rhizopus, Trichoderma, Fusarium, Cladoporium and the like. Preferably, a mixture of mold varieties is employed. The molds, besides decomposing various components, including cellulose and to a slight extent lignins, into materials which are more readily assimilable by the composting bacteria, produce potent enzymes, vitamins and growth-promoting substances which accelerate bacterial activity. By transforming components, such as cellulose, into carbohydrates which can be more readily utilized by the decomposing bacteria, the molds improve the nutritive balance of the waste medium and thus increase the amount of nitrogen fixed in the stable and highly advantageous form of microbial protoplasm. In a medium deficient in carbohydrates, a considerable amount of nitrogen is lost to the atmosphere in the form of ammonia. The molds also produce an extensive, stable mycelium which acts as a sponge-like housing carrier for the soil organisms, their end products and minerals and, therefore, serves as a highly effective base for the humus.

The raw waste is preferably inoculated with a fresh mold culture, though it may also be inoculated with material from a completed mold stage. The use of a fresh mold culture is preferred because of the presence of large numbers of bacteria, particularly of the mesophile type which develop during the mold stage and which may, therefore, cause predominance of mesophilic bacterial activity in the mold phase if the inoculant is solely material from a completed mold phase. The amount of inoculating material will vary according to the particular waste and the fungal concentration of the inoculating medium. In general about ¼ to 10% of inoculant is adequate for the purpose.

Mineral supplements may be added if the particular waste is low in mineral content desirable for proliferation of the mold organisms. In many cases, it may be desirable to add a mineral such as monocalcium phosphate both for its growth promoting value and its effect in adjusting the pH to the desired level. Monocalcium phosphate additions of about 0.25 to 0.6% are generally adequate. For optimum growth, pH of the mold phase initially is desirably within a range of about 4.5 to 6.5, preferably about 4.5 to 5.5, with optimum pH at about 5. Moisture content, if not already so, should be adjusted to about 20 to 40%, preferably about 30%. If the material is too wet, a supplement of dry material may be added to reduce moisture concentration to the desired level.

As mold activity in the mass accelerates, the temperature rises. Care must be exercised to prevent the temperature from exceeding about 50° C. The temperature is preferably maintained at about 30 to 45° C. At temperatures above about 50° C., mold activity decreases markedly and may cease altogether.

Aeration of the mass promotes and accelerates activity of the molds which are active aerobic organisms. Both aeration and temperature control may be accomplished in any desired fashion. I have found that both of these requisite conditions can be effectuated by passing air at controlled temperatures throughout the mass of material. A particularly effective means for achieving thorough, temperature-controlling aeration of the waste mass undergoing mold decomposition comprises perforating the mass at spaced intervals in such a way that certain of the perforations are open at the top of the mass but closed at the bottom whereas other perforations are open at the bottom of the mass but closed at the top. In this way, air introduced into the bottom of the mass enters into the air channels open at the bottom and passes through the material before leaving by way of the perforations open at the top.

If the temperature of the mass at the beginning of the mold stage is below about 30° C., the air introduced into the material may be heated until the temperature rises to about 30 to 35° C. At these temperatures germination of the mold spores generally becomes active in about 6 to 8 hours. The temperature of the material will then rise due to active growth of the molds and the incoming air should then be cooled sufficiently to maintain the temperature of the mass at a maximum of about 50° C.

Mold activity is generally sufficiently advanced by the end of the second day to permit initiation of the second or mesophilic bacterial stage. The material may be maintained in the mold stage for a longer period if desired, but generally, there is not much to be gained by holding for longer than about 4 days.

Bacteria and other soil organisms such as actinomycetes, which produce the desired decomposition of the waste accompanied by humus formation, are generally present in large variety in the raw waste even though they may be in dormant state. My process, by providing the microorganisms with optimum conditions for growth, stimulates their rapid development and reproduction. In some instances, the raw material may be deficient in the necessary microorganismal flora and this may be remedied by inoculation with bacterial cultures or material obtained from a completed phase in the process.

The variety of bacterial organisms which attack organic matter and function to produce humus is legion. They include, for example, members of groups such as Clostridium, Pseudomonas, Cytophaga, Mycoides, Corynebacteria, Subtilis, Mesentericus, Proteus, Nitrobacter, Azotobacter, Nitrosomonas, etc. Many are spore formers. The bacteria include aerobic, facultative and anaerobic organisms. Some thrive at temperatures within the mesophilic range, namely at temperatures up to about 45 to 50° C., whereas others are thermophilic, namely function best at temperatures above about 45 to 50° C. Many of the bacteria which function as decomposing and humus formation agents are yet to be characterized morphologically and physiologically. However, as aforementioned, for the most part, the necessary microorganisms are present in the raw wastes and are activated according to my process by production of an optimum environment.

Considerable growth and activity of mesophilic bacteria occurs during the mold stage so that at the close of optimum mold activity, mesophilic bacterial development is well advanced. However, the desired mesophilic bacterial growth is optimum at somewhat higher pH than that desirable for mold development. It is, therefore, advisable at the close of the mold phase to adjust pH of the waste to neutrality, namely to a pH of about 7.0 or somewhat higher, e. g. about 7.6. This can be accomplished by admixing an alkaline material, such as lime or, preferably, calcium carbonate, with the waste material after completion of the mold stage in suitable quantity. The amount required is generally minimized by the fact that the mesophilic bacteria developing during the mold stage usually effect an increase in pH. Both the mesophilic and subsequently active thermophilic bacteria tend, in their overall effect, to be alkaline forming.

If the temperature of the waste material is above about 40 to 45° C. at initiation of the phase in which mesophilic bacterial activity is to predominate, it is desirable to cool the material below this temperature, as, for example, down to about 30 to 35° C. If the material is being transferred to a different digestion chamber at this point, the desired cooling can be accomplished during the transfer and/or by the addition of water of suitable temperature. Water content during the predominantly mesophile and thermophile bacterial phases should be adjusted to within a range of about 40 to 70%.

At temperatures below about 45 to 50° C., mesophilic bacterial activity predominates. Because of the adjustment to a higher pH, mold activity is greatly diminished. As the mesophilic bacteria proliferate, heat is produced which causes a gradual increase in temperature to the point where the thermophilic bacteria, which have been increasingly active as the temperature rises during the phase of major mesophile activity, gain the ascendency. This generally occurs at temperatures above about 50 to 55° C.

External cooling may be resorted to if it is desired to prolong the period of mesophile predominance. However, this is ordinarily not necessary since it usually requires at least about 8 to 10 hours and frequently about 24 to 36 hours for the temperature to rise to thermophilic levels. This is generally adequate for the desired degree of activity by mesophilic bacteria, particularly since a considerable amount of such activity has taken place, though in a minor role, during the mold phase.

As aforementioned, the bacterial organisms are generally present in the raw waste so that it is rarely necessary to inoculate with bacterial cultures, though this can, of course, be done if desired. It is sometimes advantageous, as, for example, in the composting of garbage, to introduce some of the stabilized humus material produced in the final phase of the process, largely because it serves to minimize the offensive odors which may be produced during the phase of predominant mesophile activity. About 5 to 10% of the stabilized humus is generally adequate for this purpose. Some active composting material, e. g. about 1 to 10%, from a mesophile phase which is well along or completed, may be recirculated into a beginning mesophile phase because of its stimulating and accelerating effect on bacterial activity, though this is not essential.

When the temperature of the mass rises above about 45 to 50° C., thermophilic bacterial activity increases rapidly and soon predominates. The temperature during the thermophilic phase continues to increase with optimum activity generally at temperatures between about 60 to 75° C. The thermophilic activity is preferably permitted to continue until the conversion of the material by the thermophilic bacteria is completed. This is indicated by a drop in temperature to below about 50 to 45° C. The thermophilic period generally comprises a major proportion of the total active composting time and may continue for as long as 6 to 8 days in a 12 to 14 day cycle.

If the composting waste is deficient in any bacterial nutritive requirements, supplements in the form, for example, of nitrogen compounds and the like, may be added to the material to stimulate and accelerate bacterial action and to aid in the formation of a more complete humus product.

Preferably nitrogen compounds, either organic or inorganic, are added gradually. If portions are added at each stage when the material is transferred, an excess of ammonia is avoided. In other words ammonia is produced at such a rate that most of it can be utilized by the bacteria for transformation into protoplasmic nitrogen with minimum, if any loss into the atmosphere. Protoplasmic nitrogen is most valuable as a fertilizer because it is not leached out of the soil and becomes available to the plant as needed.

The mesophilic and thermophilic bacteria which function as composting agents include both facultative and obligate aerobic and anaerobic organisms. For rapid, thorough composting of the waste, it is desirable that the aerobic, anaerobic and facultative group function actively and preferably at the same time because of mutual favorable synergistic effects on growth and development of desired products. I have found that anaerobic organisms can be actively grown in close synergistic relationship with active aerobes in the presence of air. The aerobic organisms, by actively utilizing the available oxygen, provide an effective anaerobic environment for the obligate anaerobes. To effectuate such a process, it is necessary that sufficient air be provided for active proliferation of the aerobic organisms. However, it is undesirable to aerate the entire mass to the point where the oxygen available throughout the material is in excess of that which can actively be absorbed by the aerobic organisms. I have found that the desired results can be obtained by aerating only spaced portions of the mass of material as, for example, by forming open channels or perforations in the material through which air is free to circulate rather than by forcing air throughout the entire mass. In this way, air is introduced into the material in amounts sufficient for active growth of the obligate aerobes but not in such excessive amounts that the aerobic organisms cannot successfully produce the necessary anaerobic environment for obligate anaerobes.

After thorough decompostion of the material by mesophilic and thermophilic bacteria, actinomycetic action becomes predominant and the temperature of the material drops as, for example, to about 50° C. or less. The actinomycete soil organisms complete the composting action and stabilize the humus. As in the case of the mesophile and thermophile organisms, the mold-like actinomycetes are generally present in the raw material and only occasionally is it necessary to inoculate with an extraneous source of these soil organisms. However, to accelerate actinomycete growth it is frequently advantageous to inoculate with some stabilized humus from a previously completed composting.

The actinomycetes thrive at lower moisture levels than the mesophile and thermophile bacteria and drying of the humus material can be instituted during the period of actinomycete predominance. Since actinomycetes are mostly aerobic, both the desired aeration and drying may be accomplished by circulating warm air throughout the mass of the material. The temperature of the drying air should be maintained at a temperature below the thermal death point of the actinomycetes, preferably not above about 80° C. so long as it is desired to permit continuance of actinomycete activity. At such air temperatures, compost temperature will not normally rise and, in fact, will generally drop somewhat by virtue of the water evaporating action. Higher drying temperatures may be employed after adequate actinomycete activity has taken place and, if desired, the drying temperature can be raised to the sterilization point. For most purposes, however, it is desirable that the humus product contain soil organisms in viable state.

I have found that large economies in fuel can be effected by taking advantage of the elevated temperatures developed by the preceding bacterial phases. Thus the air employed for aeration and drying in the final actinomycete stage can be pre-heated indirectly by passing it through the walls of the chambers in which active mesophilic and thermophilic bacterial proliferation is proceeding. After such passage, the air is generally sufficiently warm to accomplish adequate drying of the material in the actinomycete stage by the end of the second to fourth day of the final composting phase, by which time adequate stabilization of the humus by the actinomycete organisms has generally been completed. If desired, of course, the air can be heated entirely by an external heating source or such an external heating source can be employed to supplement the heating effect of the bacterial phases.

Aeration of the predominantly actinomycete phase can be accomplished in any desired manner. I have found that both aeration and drying can be achieved very effectively in the manner aforedescribed for use in the predominantly mold stage, namely by perforating the mass at spaced intervals in such a way that certain of the perforations are open at the top of the mass but closed at the bottom, whereas other perforations are open at the bottom of the mass but closed at the top. In this way, air introduced into the bottom of the mass enters into the perforations open at the bottom and passes through substantially the entire mass of material before leaving by way of the perforations open at the top.

If desired, drying of the humus can be carried out after stabilization of the humus by the actinomycetes, in which case, aeration of the composting mass may be done with air at ordinary temperature. However, such a procedure would, in most cases, be of little advantage and would, in fact, lengthen processing time.

As aforementioned, the initial mold stage may be omitted when the raw waste is low in cellulose content. However, it is frequently desirable to introduce some cellulosic materials into the raw waste and to include a mold treatment. The assimilable carbohydrates, vitamins and other growth-promoting factors produced by the molds together with the fungal mycelium improves bacterial action and results in humus of somewhat better physical characteristics and soil-conditioning properties.

The duration of the composting period is largely determined by the type of waste. Waste high in cellulose content such as peanut hulls and bagasse generally take longer than wastes composed of starches, sugars and young plant material such as garbage, vegetable trimmings and the like. Garbage can usually be composted in 8 or 9 days, vegetable trimmings in 7 to 8 days and peanut hulls, rice hulls, bagasse and the like in about 14 to 16 days.

The humus product is a highly stable, thoroughly digested, friable or granular material, which is generally dark brown to black in color and possessed of a pleasant earthy odor. It is rich in organic and mineral nutrients and serves as a soil-air and soil-moisture conditioner of superior quality. The pH is generally on the alkaline side as, for example, between about 8 to 9. In the case of some raw materials such as hardwood sawdust, the humus may be slightly acidic as, for example, about pH 6 and is particularly suited for use with acid-tolerating plants.

Figure 6:
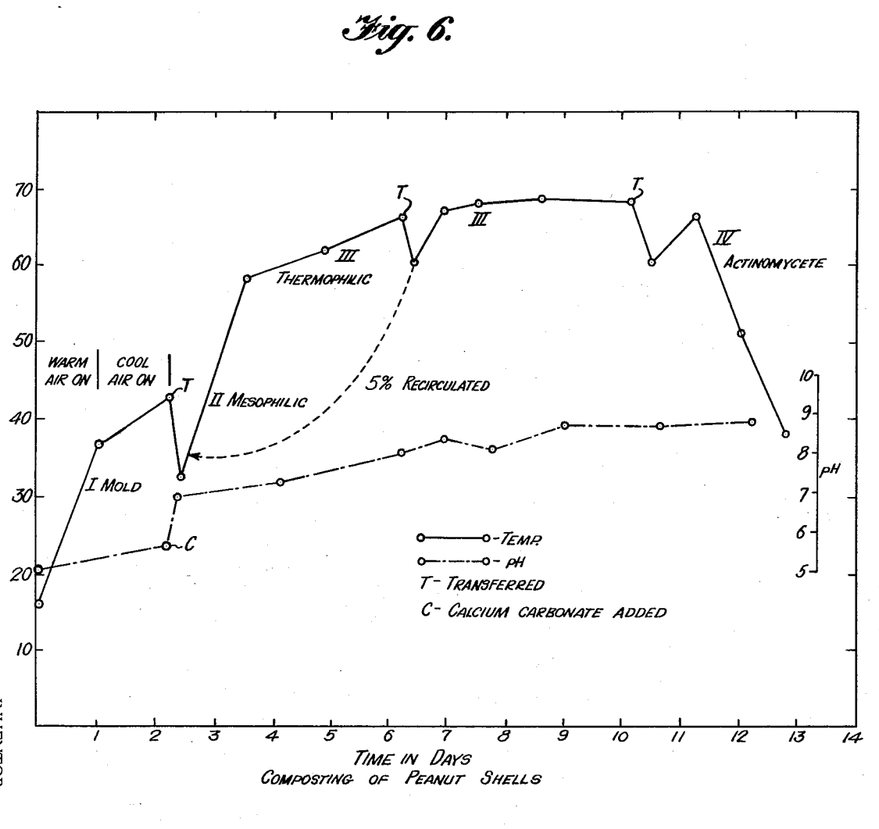
Figure 6 is a graph showing changes in temperature and pH during a typical composting of peanut shells according to my process.

Figure 6 shows graphically the progression of temperature and pH during a typical composting of ground peanut shells carried out according to my process. The process was a continuous one with the material being transferred into successive chambers at the end of the second day, the sixth day and the tenth day. The stable, dry humus was removed from the fourth and last chamber at the end of the 14th day. The fungal stage was initiated in the first chamber by inoculation with a mold culture, adjustment of pH to about 5 with monocalcium phosphate and adjustment of water content to about 30%. Warm air was forced through the mass of material until the temperature reached about 36° C. and active mold growth (I) predominated. At this point cool air was circulated through the material to keep the temperature from exceeding about 42 to 45° C. After 2 days, the material was transferred to a second chamber. Water was added to increase moisture content to about 55%. The pH was adjusted to about 7.0 with calcium carbonate. About 5% of active material obtained after completion of the mesophilic bacterial phase from a previous run was added along with nitrogenous and other mineral supplements. The temperature of the material dropped during transfer to the subsequent chamber to about 33° C. Spaced portions of the mass of material were aerated by permitting air at ordinary temperature to circulate through perforations made in the mass which provided open channels from the top to the bottom of the material. Growth of mesophilic bacteria (II), both aerobic and anaerobic, became predominant and was accompanied by a gradual rise in temperature. After about one day, the temperature rose into the thermophilic (III) range and as the temperature approached about 55° C., thermophilic bacterial activity began to predominate. At the end of the 6th day the material was transferred to a 3rd chamber where thermophilic bacterial activity continued to predominate with temperatures between about 60 to 70° C. Aeration was similar to that in the mesophilic phase. At the end of the 10th day the material was transferred to the fourth and last chamber. The mass of material was aerated throughout with air warmed by indirect heat exchange with the material in the preceding bacterial phases. Actinomycete activity (IV) increased and soon predominated with accompanying decline in temperature. Actinomycete stabilization was accompanied by gradual drying of the material. At the end of the 14th day the stable, dry humus was removed. As shown in the graph, pH of the material rose steadily. The pH of the completed humus was about 8.8.

Figure 7:
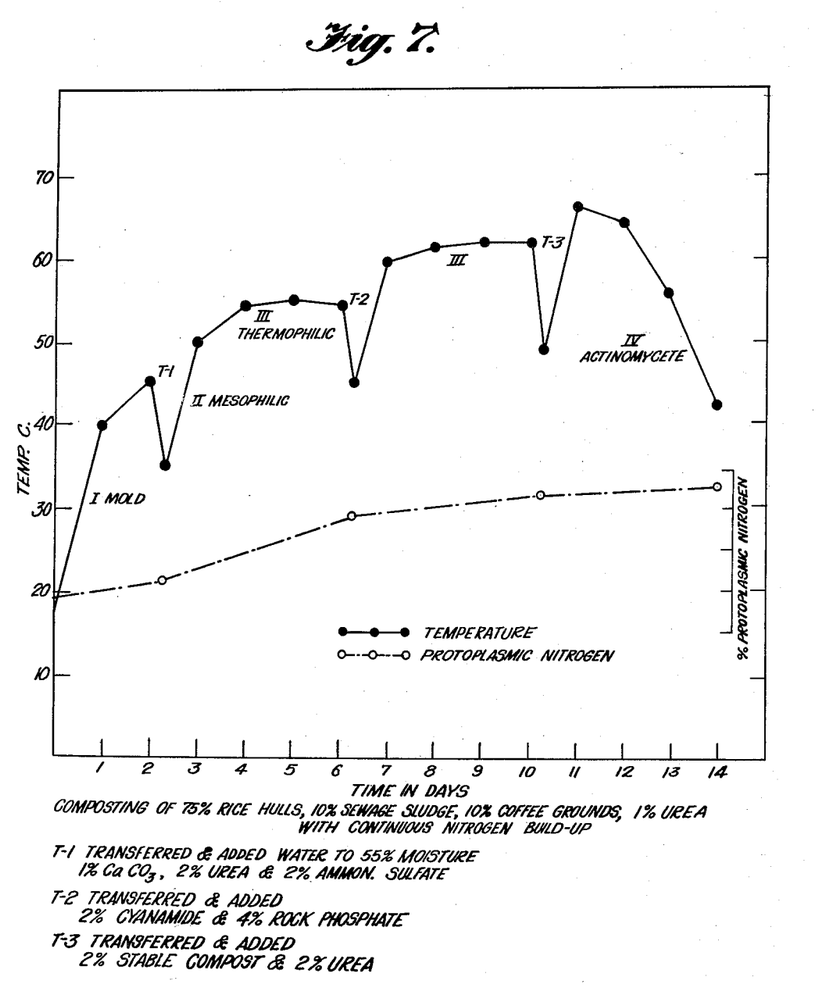
Figure 7 is a graph illustrating a composting of raw wastes comprising rice hulls, sewage sludge and coffee grounds.

Figure 7 is a graphic presentation of a composting run of raw waste which comprised 75% rice hulls, 10% sewage sludge and 10% coffee grounds plus 1% urea. Additional nitrogen supplements were added at each transfer. As shown on the graph, protoplasmic nitrogen increased markedly during the composting cycle, namely from about 1.5% to 3.7%.

Table I gives an analysis of the bacterial and actinomycete population during a typical composting of garbage carried out according to my aforedescribed process. In this particular run, the initial mold stage was omitted and processing of the raw garbage was initiated with a predominantly mesophilic phase.

tervals in such a way that only spaced portions of the mass are directly in contact with air which is allowed to circulate through the open channels. Mesophilic bacterial activity becomes predominant and continues until the temperature rises to thermophilic bacterial levels. The material is kept in this chamber for about 2 to 4 days after which it is transferred to a third chamber where thermophilic activity predominates. Transfer from the 2nd to the 3rd chamber can be made as soon as thermophilic activity begins to predominate. However, this is not necessary. It is preferable, in order to maintain smooth flow of the material in a continuous process, to space transfer of the materials at substantially equal intervals. Since the mesophilic period is shorter generally than the thermophilic period, it is preferable to permit some predominantly thermophilic bacterial action in the 2nd chamber. The mass undergoing predominantly thermophilic decomposition in the 3rd chamber is aerated in the same manner as the material in the 2nd chamber. Although thermophilic bacterial activity can be allowed to go to completion in the second chamber, transfer to a third chamber is preferable to make room for the mesophilic stage of a subsequent run. After about 2 to 4 days in the third chamber, the largely decomposed material is transferred to a fourth chamber where the mass is thoroughly aerated as in the first chamber to favor predominant growth of actinomycete soil organisms. Air, warmed indirectly by passage through the walls of the second and third chambers may be employed to aerate the material in this final composting stage and thus accomplish drying of the material. After about 2 to 4 days in the fourth chamber the stable, dry humus can be removed from the system and bagged or otherwise packaged.

The composting chambers are, of course, designed in size to accommodate the required load. A single series of 4 chambers may be employed or the number of units may be doubled, tripled, etc. depending on particular requirements. For example, where there is a daily load

*Table I*

| Stage | Aerobic | Aerobic thermophilic | Aerobic spore forming | Anaerobic | Anaerobic thermophilic | Anaerobe spore forming | Actinomycetes, thousands/gm. |
|---|---|---|---|---|---|---|---|
| | Bacteria, millions/gm. dry basis | | | | | | |
| Raw | 725 | 2 | 1¼ | 48 | Few | Few | 21 |
| Mesophilic | 1,200 | 7 | 35 | 4,000 | 6 | 3 | 24 |
| Thermophilic | 800 | 300 | 50 | 200 | 60 | | 250 |
| Actinomycete | 320 | 120 | 160 | Few | 6 | Few | 150,000 |

The process, though it may be carried out batch-wise, is preferably, from an economic point of view, conducted on a continuous basis. Such a continuous process can be carried out by transferring the composting material to successive chambers in each of which at least one of the predominant microorganismal stages takes place.

I have found a particularly effective method for carrying out a continuous process to be as follows. The comminuted raw material, after mixing with suitable mold inoculant and adjustment, if necessary, of pH and water content, is introduced into a chamber of suitable size where it is aerated substantially throughout the mass, preferably by means of perforations, some of which are open only at the top and others of which are open only at the bottom of the mass, as aforedescribed. The thorough aeration stimulates growth of the actively aerobic molds. After about 2 to 4 days, the material is transferred, preferably by way of a mixing means whereby alkaline material such as calcium carbonate, additional water and other supplements such as inoculant, nitrogen compounds and other nutrient additives can be incorporated into the material, into a second chamber. In the second chamber, the material is perforated at spaced inand the material is maintained in each of the successive chambers of the process for two day intervals, it is desirable to provide a double series of units, namely 8 chambers. Thus, while one load is being processed through one series of 4 chambers, a second load can be started the following day and processed through the other series of 4 chambers. If the chambers are of sufficient size to hold a 2-day supply of waste material, a single series of 4 chambers can be employed in a 2-day transfer process. A current day's supply can be introduced into the first chamber, filling it half full, and the composting process begun. On the following day, the remainder of the first chamber is filled. At the end of the second day, the material in the bottom half of the chamber is transferred to the second chamber and all subsequent transfers comprise the bottom half of the material in any given chamber. In a similar manner, a double series of chambers can be employed to accommodate daily loading in a 4-day transfer process. Suitable perforation to permit the necessary aeration must, of course, be made in the composting mass after each transfer of material.

Processing of the raw waste to thoroughly digested, stable humus can be completed in a matter of days, e. g.

about 6 to 16 days. The process is easily controlled and requires a minimum of labor. The waste can be processed continuously through relatively simple equipment. With suitable equipment of adequate size, daily disposal loads can be immediately and continuously processed.

Figures 1, 4:
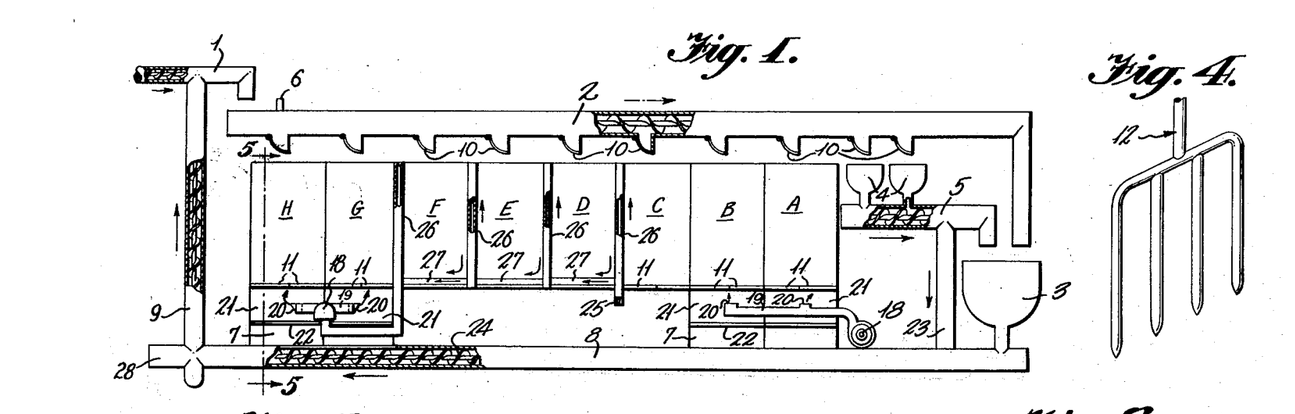
Figure 1 is a diagrammatic view of apparatus which can be used in carrying out my process.
Figure 4 is a diagrammatic view of a perforating fork employed to perforate the waste material.

Figure 1 is a diagrammatic view of apparatus for carrying out my process in a highly efficient and economical manner. The raw material is introduced via intake conveyer 2 into mixer 3. Needed additives, such as mold inoculant, pH adjusters and the like, in bins 4 are conveyed into the mixer via percentage feeder 5. Water, if needed, is introduced into the system by way of inlet 6 and carried into the mixer via top conveyer 2. After thorough mixing of the raw material and added components, the mass is dropped into hopper 7, shown in Figure 5, and thence into bottom conveyer 8. The hopper, which is situated along the top of the bottom conveyer, opens downwardly into the bottom conveyer. The bottom conveyer carries the material to elevator conveyer 9 from which the material is in turn transferred to top conveyer 2. The top conveyer is equipped with spaced, selectively operable gates 10. The mold-inoculated waste is dropped into digestion chamber A. All of the digestion chambers are equipped at the bottom with perforated gates 11 which can be opened to permit discharge of the composting material into the hopper.

For prolific growth of the aerobic molds, the composting material is thoroughly aerated by perforating the material downwardly at spaced intervals with a tined fork 12, shown in Figure 4. The perforations are made in such a way that a row of perforations or air channels 13 which extend through the material and are open at the bottom alternates with a row of perforations or air channels 15 which are open at the top but stop short of the bottom of the composting material and are, therefore, closed at the bottom. The perforations 13 which extend through the bottom of the composting material are made by pushing the tines of the perforating fork downwardly through the composting mass at points where the ends of the tines can project through perforations 16 in the bottom gates 11. Perforations 15 are made by stopping the downward thrust of the tines short of the bottom of the composting material. The top end of the perforations which open through the bottom of the composting material is closed by covering with an air-tight cover or cap 17.

Figures 2, 5:
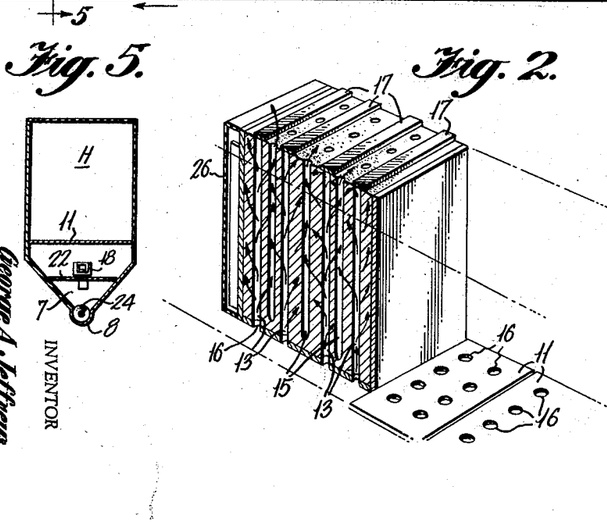
Figure 2 is a fragmentary perspective view showing the air-circulation passages of Figure 3.
Figure 5 is a cross sectional view taken along lines 5—5 of Figure 1.
Figure 3:
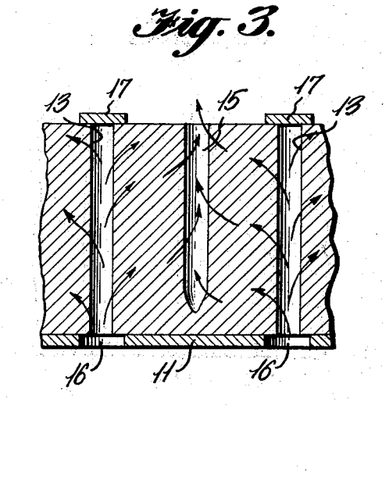
Figure 3 is a fragmentary view in vertical section showing air-circulation passages in the composting material in chambers A, B, G and H.

Air is introduced by means of air blower 18 and duct 19 through air vent 20 into air chamber 21. The bottom of air chamber 21 is formed by air-tight gate 22 which opens downwardly when the composting material in the digestion chamber is to be discharged into the hopper and bottom conveyer. The air passes up into the composting material through the perforations in bottom gate 11 and air channels 13 which open through the bottom of the composting material. Since the tops of these passages are closed, the air is forced to circulate through the mass of the material and to exit through the open tops of air channels 15 as shown in Figures 2 and 3. Thus substantially the entire mass of the composting material is thoroughly aerated. At the start of the process, the air may be heated prior to introduction into the material in order to accelerate active proliferation of the fungi. After active mold growth starts, it is generally necessary to cool the incoming air to prevent undue elevation of the temperature.

After 2 days of active mold growth in digestion chamber A, gates 11 and 22 are opened and the material is discharged into hopper 7 and bottom conveyer 8. The material is then transferred to digestion chamber C by means of the bottom, elevator and top conveyers. Adjustment of water content is made by addition of water via water inlet 6. Other components such as calcium carbonate to adjust pH, nitrogen compounds and the like, can be added from bins 4 and percentage feeder 5 which communicates with the bottom conveyer through pipe 23. Thorough mixing of the added components with the composting material is accomplished in the conveyers during transfer by action of the rotary conveyer screw 24. A portion of the material leaving chamber A may be diverted to one of the bins 4 for addition to an incoming load of raw waste. After transfer of the material from chamber A to chamber C, chamber A is ready for charging with a new load of raw waste.

After chamber C is filled the material is downwardly perforated at spaced intervals with fork 12. Unlike the situation in chamber A, all perforations extend clear through the composting material and are open at top and bottom of the mass. The perforations are positioned in such a manner that the bottoms of the resulting channels in the composting material open into the perforations in the bottom perforated gate. Thus a natural circulation of air is permitted through the open air channels in the mass. Sufficient air penetrates into the material adjacent the air channels to permit active growth of the aerobic bacteria which, in turn, by virtue of their active absorption of the available oxygen, provide an adequately anaerobic environment for active growth of anaerobic bacteria.

In the course of transfer from chambers A to C, the temperature of the material is reduced. The temperature can be further reduced, if desired, by regulation of the temperature of the added water.

The material in chamber C undergoes digestion and decomposition by bacteria, both aerobic and anaerobic, which are active in the mesophilic temperature range. The active growth of the mesophilic bacteria causes a rise in temperature and generally some time before the end of the second day, the temperature rises to thermophilic level and the thermophilic bacteria become predominant.

After 2 days the bottom gate 11 of chamber C is opened and the composting material is discharged into the hopper and bottom conveyer. The waste is then transferred to chamber E. Any desired addition such as water, nitrogen, mineral nutrients and the like can be added as aforedescribed.

In chamber E, the composting material is perforated as in chamber C and predominantly thermophilic bacterial activity continues. After two days, the composting material is transferred to chamber G.

In chamber G, which like chamber A, is equipped at the bottom with an air chamber 21, air blower 18 and air vent 20, the composting material is perforated in a manner similar to that in chamber A so that air is passed through substantially the entire mass to stimulate growth of the aerobic actinomycete soil organisms.

The air which is introduced into chamber G is preferably heated so that drying of the material can be instituted during the actinomycetic stabilization of the humus. Although the air can be heated by an external source of heat, it is most economical to utilize the heat produced during the bacterial phases taking place in chamber C, D, E and F. This can be accomplished by a system of indirect heat excange between the material undergoing bacterial decomposition and the air which is subsequently introduced into the last phase of the process. As illustrated in Figure 1, air is drawn into duct 25, passes through hollow partitioning walls 26 and connecting air ducts 27 before entering blower 18. The air picks up heat from the material in the bacterial phases and is sufficiently warm gradualy to dry the humus in chamber G.

After 2 days in chamber G, the dry, stable humus is dropped into the hopper and bottom conveyer and discharged from the system via exit 28. A portion of the stabilized material can be retained in the system by transfer to bin 4 for inoculation of material entering the last or actinomycete phase to accelerate activity of the soil organisms or for inoculation of material entering the mesophilic bacterial phase to neutralize bad odors which might be produced during this stage of decomposition.

Chambers B, D, E and H duplicate respectively chambers A, C, E and G and are provided to permit daily loading with fresh raw waste materials. Thus, on the day after loading of chamber A chamber B is loaded and the composting process continues with transfer of the composting mass at 2-day intervals successively to chambers D, E and H.

It will be understood that the time intervals between transfer of material can be varied as desired. Transfer, for example, can be made at 3- or 4-day intervals with suitable spacing between initial loading.

The system as aforedescribed can also be employed with daily loading and transfer from chamber to chamber at 4-day intervals if the chambers are sufficiently large to accommodate a two day supply of waste. Thus, at the start of the process, half of chamber A can be loaded; on the second day loading is completed; on the third day, half of chamber B is loaded; and on the fourth day, the remainder of chamber B is loaded. Transfer of the bottom half of each chamber is made at 4-day intervals.

If the waste material being composted does not require a mold treatment, the composting equipment can be built without the equivalent of chambers A and B, or else, the mold phase chambers can be by-passed and processing begun in chambers C and D.

Although this invention has been described with reference to illustrative embodiments thereof, it will be apparent to those skilled in the art that it may be embodied in other forms within the scope of the appended claims.

I claim:

1. A process for composting organic waste materials which comprises subjecting waste material having a minimum pH of about 7, a water content within the range of about 40 to 70% and a temperature substantially below about 45° C. to the predominant action of mesophilic bacteria while aerating only predetermined spaced portions within the mass of material, whereby only said portions within the material are aerated, until the temperature of the mass by virtue of the active growth of the mesophilic bacteria rises above about 45 to 50° C., then subjecting the mass to the predominant action of thermophilic bacteria at temperatures above about 45 to 50° C. while aerating only predetermined spaced portions within the mass of material, whereby only said portions within the material are aerated, until substantial decomposition of the waste material has taken place aeration of the predominantly mesophilic and predominantly thermophilic bacterial stages being accomplished by perforating the mass of material at spaced intervals to form continuous air channels open at two surfaces of the mass and permitting air to circulate through said channels, both obligate aerobic and obligate anaerobic bacteria proliferating actively and simultaneously during said mesophilic and thermophilic bacterial phases, within the body of the material then subjecting the material to the predominant action of actinomycete organisms while aerating the material substantially throughout its mass.

2. A process for composting organic waste materials which comprises subjecting waste material having a pH of about 4.5 to 6.5 and water content of about 20 to 40% to the action of molds while maintaining the temperature of the waste mass below about 50° C. and aerating the material substantially throughout its mass, then adjusting the pH of the material to at least about 7, moisture content to about 40 to 70% and temperature to substantially below about 45° C. and subjecting the material to the predominant action of mesophilic bacteria while aerating only predetermined spaced portions within the material are aerated, until the temperature of the mass by virtue of the active growth of the mesophilic bacteria rises above about 45 to 50° C., then subjecting the mass to the predominant action of thermophilic bacteria at temperatures above about 45 to 50° C. while aerating only predetermined spaced portions within the mass of material, whereby only said portions within the material are aerated, until substantial decomposition of the waste material has taken place aeration of the predominantly mesophilic and predominantly thermophilic bacterial stages being accomplished by perforating the mass of material at spaced intervals to form continuous air channels open at two surfaces of the mass and permitting air to circulate through said channels, both obligate aerobic and obligate anaerobic bacteria proliferating actively and simultaneously during said mesophilic and thermophilic bacterial phases, within the body of the material then subjecting the material to the predominant action of actinomycete organisms while aerating the material substantially throughout its mass.

3. A process for composting organic waste materials which comprises subjecting waste material having a pH of about 4.5 to 5.5 and water content of about 20 to 40% to the action of molds while maintaining the temperature of the waste mass below about 50° C. and aerating the material substantially throughout its mass, then adjusting the pH of the material to at least about 7, moisture content to about 40 to 70% and temperature to substantially below about 45° C. and subjecting the material to the predominant action of mesophilic bacteria while aerating only predetermined spaced portions within the mass of material, whereby only said portions within the material are aerated, until the temperature of the mass by virtue of the active growth of the mesophilic bacteria rises above about 45 to 50° C., then subjecting the mass to the predominant action of thermophilic bacteria at temperatures above about 45 to 50° C. while aerating only predetermined spaced portions within the mass of material, whereby only said portions within the material are aerated, until substantial decomposition of the waste material has taken place aeration of the predominantly mesophilic and predominantly thermophilic bacterial stages being accomplished by perforating the mass of material at spaced intervals to form continuous air channels open at two surfaces of the mass and permitting air to circulate through said channels, both obligate aerobic and obligate anaerobic bacteria proliferating actively and simultaneously during said mesophilic and thermophilic bacterial phases, within the body of the material then subjecting the material to the predominant action of actinomycete organisms while aerating the material substantially throughout its mass.

ting air to circulate through said channels, then subject-

4. A process for composting organic waste materials which comprises subjecting waste material having a pH of about 5 and water content of about 30% to the action of molds while maintaining the temparature of the waste mass at about 30 to 45° C. and aerating the material substantially throughout its mass, then adjusting the pH of the material to at least about 7, moisture content to about 40 to 70% and temperature to substantially below about 45° C. and subjecting the material to the predominant action of mesophilic bacteria while aerating only predetermined spaced portions within the mass of material, whereby only said portions within the material are aerated, until the temperature of the mass by virtue of the active growth of the mesophilic bacteria rises above 45 to 50° C., then subjecting the mass to the predominant action of thermophilic bacteria at temperatures above 45 to 50° C. while aerating only predetermined spaced portions within the mass of material, whereby only said portions within the material are aerated, until substantial decomposition of the waste material has taken place aeration of the predominantly mesophilic and predominantly thermophilic bacterial stages being accomplished by perforating the mass of material at spaced intervals to form continuous air channels open at two surfaces of the mass and permitting air to circulate through said channels, both obligate aerobic and obligate anaerobic bacteria proliferating actively and simultaneously during said mesophilic and thermophilic bacterial phases, within the body of the material then subjecting the material to the predominant action of actinomycete organisms while aerating the material substantially throughout its mass.

5. The process of claim 1 in which the material being subjected to predominant action of actinomycete organisms is aerated substantially throughout its mass with warm air at a temperature below that which kills the actinomycetes.

6. The process of claim 5 in which the material being subjected to predominant action of actinomycete organisms is aerated substantially throughout its mass with air heated indirectly by the material undergoing predominantly bacterial decomposition.

7. The process of claim 2 in which the material being subjected to predominant action of actinomycete organisms is aerated substantially throughout its mass with warm air at a temperature below that which kills the actinomycetes.

8. The process of claim 7 in which the material being subjected to predominat action of actinomycete organisms is aerated substantially througout its mass with air heated indirectly by the material undergoing predominantly bacterial decomposition.

9. The process of claim 3 in which the material being subjected to predominant action of actinomycete organisms is aerated substantially throughout its mass with air heated indirectly by the material undergoing predominantly bacterial decomposition.

10. A process for composting organic waste materials which comprises subjecting waste material having a minimum pH of about 7, a water content within the range of about 40 to 70% and a temperature substantially below about 45° C. to the predominant action of mesophilic bacteria while aerating only predetermined spaced portions within the mass of material, whereby only said portions within the material are aerated, until temperature of the mass by virtue of the active growth of the mesophilic bacteria rises above about 45 to 50° C., then subjecting the mass to the predominant action of thermophilic bacteria at temperatures above about 45 to 50° C. while aerating only predetermined spaced portions within the mass of material, whereby only said portions within the material are aerated, until substantial decomposition of the waste material has taken place, both obligate aerobic and obligate anaerobic bacteria proliferating actively and simultaneously during said mesophilic and thermophilic bacterial phases, the aeration of the predominantly mesophilic and predominantly thermophilic bacterial stages being accomplished by performing the mass of material at spaced intervals to form air channels open at the top and bottom of the material and permitting air to circulate through said channels, then subjecting the material to the predominant action of actinomycete organisms while aerating the material substantially throughout its mass by perforating the mass of material in such manner that some of the perforations are closed at the top of the material and open at the bottom of the material and other perforations are open at the top of the material and closed at the bottom of the material and passing air into the material through the perforations open at the bottom, and out of the material through the perforations open at the top.

11. A process for composting organic waste materials which comprises subjecting waste material having a pH of about 4.5 to 6.5 and water content of about 20 to 40% to the action of molds while maintaining the temperature of the waste mass below about 50° C. and aerating the material substantially throughout its mass, then adjusting the pH of the material to at least about 7, moisture content to about 40 to 70% and temperature to substantially below about 45° C. and subjecting the material to the predominant action of mesophilic bacteria while aerating only predetermined spaced portions with the mass of material, whereby only said portions within the material are aerated, until the temperature of the mass by virtue of the active growth of the mesophilic bacteria rises above about 45 to 50° C., then subjecting the mass to the predominant action of thermophilic bacteria at temperatures above about 45 to 50° C. while aerating only predetermined spaced portions within the mass of material, whereby only said portions within the material are aerated, until substantial decomposition of the waste material has taken place, both obligate aerobic and obligate anaerobic bacteria proliferating actively and simultaneously during said mesophilic and thermophilic bacterial phases, the aeration of the predominantly mesophilic and predominantly thermophilic bacterial stages being accomplished by perforating the mass of material at spaced intervals to form air channels open at the top and bottom of the material and permitting the material to the predominant action of actinomycete organisms while aerating the material substantially throughout its mass by perforating the mass of material in such manner that some of the perforations are closed at the top of the material and open at the bottom of the material and other perforations are open at the top of the material and closed at the bottom of the material and passing air into the material through the perforations open at the bottom, and out of the material through the perforations open at the top.

12. The process of claim 11 in which the initial pH of the waste material being subjected to the action of molds is about 4.5 to 5.5.

13. The process of claim 12 in which the material being subjected to predominant action of actinomycete organisms is aerated substantially throughout its mass with warm air at a temperature below the thermal death point of the actinomycetes.

14. The process of claim 13 in which the material being subjected to predominant action of actinomycete organisms is aerated substantially throughout its mass with air heated indirectly by the material undergoing predominantly bacterial decomposition.

15. The process of claim 10 in which the material being subjected to predominant action of actinomycete organisms is aerated substantially throughout its mass with warm air at a temperature below the thermal death point of the actinomycetes.

16. The process of claim 15 in which the material being subjected to predominant action of actinomycete organisms is aerated substantially throughout its mass with air heated indirectly by the material undergoing predominantly bacterial decomposition.

17. The process of claim 1 in which nitrogenous nutrient is incorporated into the composting mass at intervals during the composting process.

18. The process of claim 2 in which nitrogenous nutrient is incorporated into the composting mass at intervals during the composting process.

19. A process for composting organic waste materials which comprises subjecting waste material having a minimum pH of about 7, a water content within the range of about 40 to 70% and a temperature substantially below about 45° C. to the predominant action of mesophilic bacteria while aerating only predetermined spaced portions within the mass of the material by perforating substantially the entire body of material with air channels at spaced intervals and circulating air within said channels, whereby only said spaced portions within the body of the material are actively aerated and both obligate aerobic and obligate anaerobic mesophilic bacteria proliferate actively and simultaneously within the body of the material during said mesophilic phase, until the temperature of the mass by virtue of the active growth of the mesophilic bacteria rises above about 45 to 50° C., then subjecting the mass to the predominant activity of thermophilic bacteria at temperatures above about 45 to 50° C. while aerating only predetermined spaced portions within the mass of the material by perforating substantially the entire body of material with air channels at spaced intervals and circulating air in said channels, whereby only said spaced portions within the body of the material are actively aerated and both obligate aerobic and obligate anaerobic thermophilic bacteria proliferate actively and simultaneously within the body of the material during said thermophilic phase, until substantial decomposition of the waste material has taken place, then subjecting the material to the predominant action of actinomycete organisms while aerating the material substantially throughout its mass.

20. A process for composting organic waste materials which comprises subjecting waste material having a pH of about 4.5 to 6.5 and water content of about 20 to 40% to the action of molds while maintaining the temperature of the waste mass below about 50° C. and aerating the material substantially throughout its mass, then adjusting the pH of the material to at least about 7, moisture content to about 40 to 70% and temperature to substantially below about 45° C. and subjecting the material to the predominant action of mesophilic bacteria while aerating only predetermined spaced portions within the mass of the material by perforating substantially the entire body of material with air channels at spaced intervals and circulating air within said channels, whereby only said spaced portions within the body of the material are actively aerated and both obligate aerobic and obligate anaerobic mesophilic bacteria proliferate actively and simultaneously within the body of the material during said mesophilic phase, until the temperature of the mass by virtue of the active growth of the mesophilic bacteria rises above about 45 to 50° C., then subjecting the mass to the predominant activity of the thermophilic bacteria at temperatures above about 45 to 50° C. while aerating only predetermined spaced portions within the mass of the material by perforating substantially the entire body of material with air channels at spaced intervals and circulating air in said channels, whereby only said spaced portions within the body of the material are actively aerated and both obligate aerobic and obligate anaerobic thermophilic bacteria proliferate actively and simultaneously within the body of the material during said thermophilic phase, until substantial decomposition of the waste material has taken place, then subjecting the material to the predominant action of actinomycete organisms while aerating the material substantially throughout its mass.

References Cited in the file of this patent

UNITED STATES PATENTS

| | | |
|---|---|---|
| 2,043,265 | Roeder | June 9, 1936 |
| 2,285,834 | Proctor | June 9, 1942 |
| 2,337,686 | Sherman | Dec. 28, 1943 |
| 2,474,833 | Eweson | July 5, 1949 |
| 2,636,823 | Becze | Apr. 28, 1953 |

FOREIGN PATENTS

| | | |
|---|---|---|
| 435,380 | Great Britain | Sept. 16, 1935 |